C. SHORTAU.

Assignor, by mesne assignments, to WASHBURN & MOEN MAUNFACTURING COMPANY.

Wire-Twisting Machine.

No. 8,032. Reissued Jan. 8, 1878.

Witnesses:
Harold Serrell
Chas. H. Smith

Inventor:
Carl Shortau,
per Lemuel W. Serrell atty.

UNITED STATES PATENT OFFICE.

CARL SHORTAU, OF NEW YORK, N. Y., ASSIGNOR, BY MESNE ASSIGNMENTS, TO WASHBURN & MOEN MANUFACTURING COMPANY.

IMPROVEMENT IN WIRE-TWISTING MACHINES.

Specification forming part of Letters Patent No. 66,896, dated July 16, 1867; Reissue No. 8,032, dated January 8, 1878; application filed October 22, 1877.

*To all whom it may concern:*

Be it known that I, CARL SHORTAU, of the city and State of New York, have invented an Improvement in Wire-Twisting Machines, of which the following is a specification:

In machinery for twisting wire in the manufacture of heddles a revolving gear with a slot for the reception of the wires had been used before this invention; but such slot had in it a pin to form the middle eye, and the wire passed at each side of other pins to form the top and bottom eyes.

In the present invention the gear is simply provided with an unoccupied slot, into which the band passes, and there are stationary jaws, which are also adapted to receive and hold the band to which the twist is to be imparted.

This machine is intended especially for imparting a twist to the metallic bands employed in the manufacture of that class of hats known as the "resorte hats."

Figure 1:
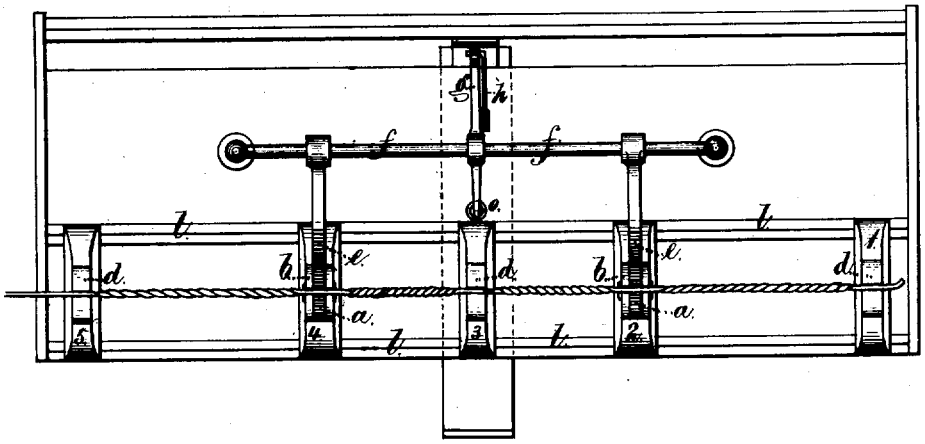
Figure 2:
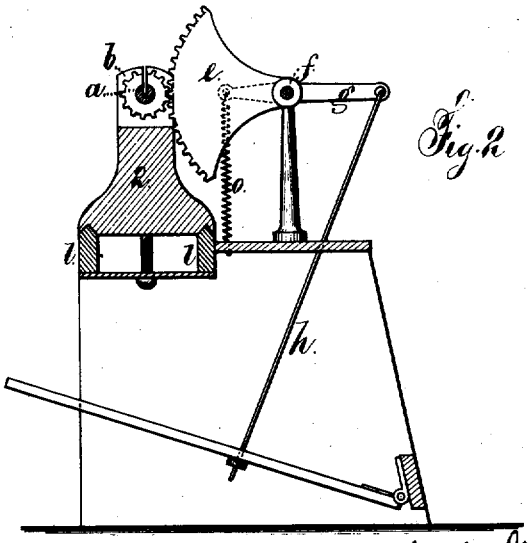

In the drawing, Figure 1 is a plan of the machine, and Fig. 2 is a transverse section.

The gear or pinion wheel *a* is made with a radial slot running from the center outwardly, and of a width to receive the bands to be twisted. This pinion is provided with hubs or journals, that are mounted in a suitable frame or bearings, *b*, wherein it can be revolved.

The wire is also received in the stationary jaws *d*, that are made with openings adapted to receive and hold such wire to be twisted.

The sectors *e* are the means represented for revolving the slotted pinions *a*, and these sectors are upon a shaft, *f*, that is parallel to the axis of the pinions, and receiving a turning movement from a crank-arm, *g*, and connection *h* to a treadle. The sectors are represented as upon the shaft *f*, and they are properly positioned in relation to the pinions to be revolved.

The stocks or bearings *b* for the pinions and the supports for the stationary jaws *d* are represented upon the frame or bed *l*, and clamped by a proper screw, so that the parts can be positioned with reference to the length of material being twisted, as the same can be more or less, as desired.

It will now be evident that, the wires or bands being laid successively into the slotted pinions and stationary jaws, the metal will receive the required twist by revolving the pinions, the twist between the jaw *d* on the first head, 1, and the slotted pinion *a* upon the second head, 2, being in one direction, and the twist between the pinion *a* of 2, and the second jaw, *d*, of 3 will be in the opposite direction, and so on, viz., between 3 and 4 will be in the same direction as between 1 and 2, and in the opposite direction to that between 2 and 3, and between 4 and 5 will be in the same direction as between 2 and 3, but the reverse to that between 3 and 4.

The slotted jaws are suitably formed to grasp and hold the wire or band between them. The revolution of the pinions communicates the necessary twist to the wire or band. The wire is then taken out and the parts returned to their normal position to receive other wires or bands.

The helical spring *o* is represented as operating to return the parts to position after the treadle is liberated.

What I claim as my invention is—

1. The combination, with a jaw to hold the band to be twisted, of a revolving pinion or hub having a radial unoccupied slot, into which such band fits, substantially as set forth.

2. The combination, in a wire-twisting machine, of two slotted holding-jaws and an intermediate radially-slotted pinion or hub, revolved by gearing, and acting to twist the wire in opposite directions between the said pinion and the respective stationary jaws, substantially as set forth.

3. The combination, in a wire-twisting machine, of two revolving radially-slotted pinions or hubs, in combination with an intermediate stationary slotted holding-jaw, whereby the wire or band is twisted in opposite directions at the respective sides of the stationary jaw, substantially as set forth.

4. The slotted holding-jaws *d*, *d*, and *d* upon the bed *l*, and the slotted pinions or hubs *a a*, in combination with the sectors and actuating mechanism, substantially as set forth.

Signed by me this 2d day of October, A. D. 1877.

CARL SHORTAU. [L. S.]

Witnesses:
JOHN C. HERTLE,
WM. H. POST.